(12) United States Patent
Inayama (10) Patent No.: US 6,426,934 B1
(45) Date of Patent: Jul. 30, 2002

(54) ONE-BIT DATA REPRODUCING SYSTEM HAVING CONTROLLABLE LOW PASS FILTER CHARACTERISTICS

(75) Inventor: Minoru Inayama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/410,079

(22) Filed: Oct. 1, 1999

(30) Foreign Application Priority Data

Oct. 9, 1998 (JP) ............................................. 10-288558
Nov. 30, 1998 (JP) ............................................. 10-340718

(51) Int. Cl.$^7$ ................................................ G11B 7/00
(52) U.S. Cl. ................ 369/124.01; 369/47.23
(58) Field of Search ................ 369/124.01, 124.04, 369/124.05, 124.13, 47.15, 47.17, 47.19, 47.23, 47.26, 47.35

(56) References Cited

FOREIGN PATENT DOCUMENTS

| WO | 1994306599 | 8/1994 |
|---|---|---|
| WO | 9419872 | 9/1994 |
| WO | 1996511733 | 10/1996 |

*Primary Examiner*—Paul W. Huber
(74) *Attorney, Agent, or Firm*—Jay H. Maioli (57) ABSTRACT

A reproducing apparatus and a signal processing apparatus each having a filter for eliminating cross modulation distortion when cross modulation noise is caused by poor compatibility with an amplifier or a speaker connected to a reproducing apparatus for reproducing a digital signal composed of quantization one-bit data having high-frequency band.

20 Claims, 9 Drawing Sheets

ONE-BIT DATA REPRODUCING SYSTEM HAVING CONTROLLABLE LOW PASS FILTER CHARACTERISTICS

BACKGROUND OF THE INVENTION

The present invention relates generally to a reproducing apparatus and a signal processing apparatus each having a filter for eliminating cross modulation distortion if a cross modulation noise is caused by poor compatibility between an amplifier and a speaker connected to a reproducing apparatus for reproducing a digital signal of which quantization bit having high-frequency band is one bit.

Figure 1:
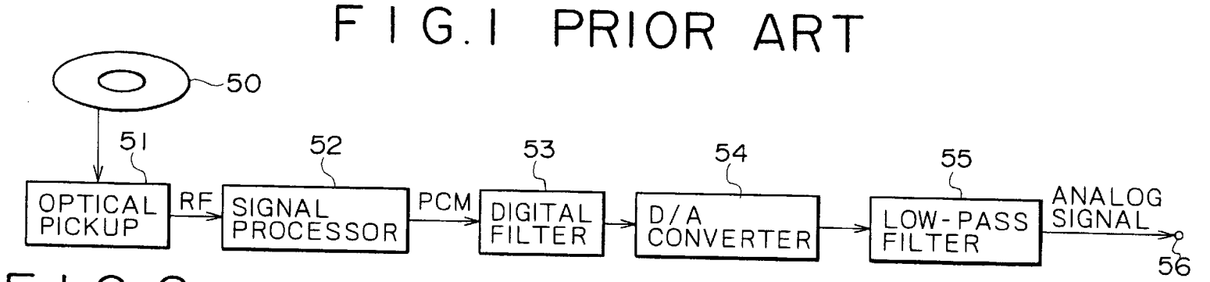
FIG. 1 is a block diagram illustrating a constitution of a related-art optical disc reproducing apparatus.

The PCM (Pulse Code Modulation) signal for use in the compact disc (CD) is a digital signal which is limited in band to 22 KHz. As shown in FIG. 1, an RF signal reproduced by an optical pickup 51 from an CD 50 is converted by a signal processor 52 into a PCM signal. The PCM signal is then filtered by a digital filter 53 to steeply eliminate sampling noise higher than 22 KHz. The resultant signal is then converted by a D/A converter 54 into an analog signal to be supplied to an analog low-pass filter 55.

Recently, a digital audio signal has become a focus of attention which consists of one bit data obtained by performing delta sigma (ΔΣ) modulation on an analog audio signal. This digital audio signal is hereafter referred to as a direct stream digital (DSD) signal. Compared with a conventional PCM audio signal having format of sampling frequency 44.1 KHz and data word length 16 bits for example, the DSD signal comprises a very high sampling frequency such as 64 times 44.1 KHz and a short data word length such as one bit for example, featuring a wide transmittable frequency band. In addition, in the audio band, which is low enough by performing sampling on such a high over-sampling frequency as 64 times 44.1 KHz, the DSD signal can ensure a high dynamic range. These features allow this signal to be applied to recording and data transmission for example of high tonal quality.

Figure 2:
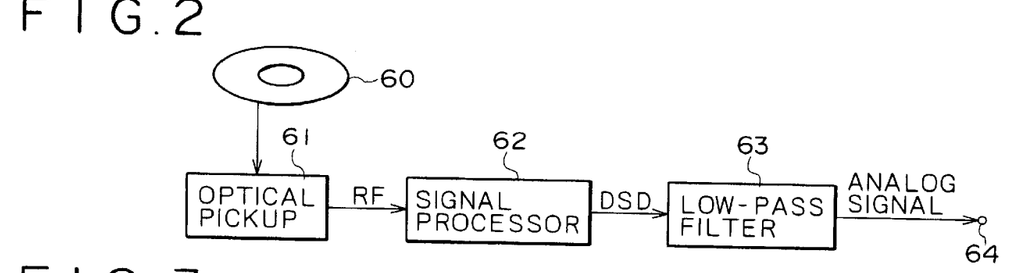
FIG. 2 is a block diagram illustrating a constitution of an optical disc reproducing apparatus for reproducing a DSD signal.

The DSD signal is also a one-bit pulse train having a signal component ranging to 1.4 MHz. Simply passing this signal through a low-pass filter provides an analog audio signal. As shown in FIG. 2 for example, an RF signal is reproduced through an optical pickup 61 from an optical disc 60 on which a DSD signal is recorded and the RF signal is converted by a signal processor 62 into the DSD signal. This DSD signal is then passed through a low-pass filter 63 to obtain an analog audio signal at an output terminal 64.

Figure 3:
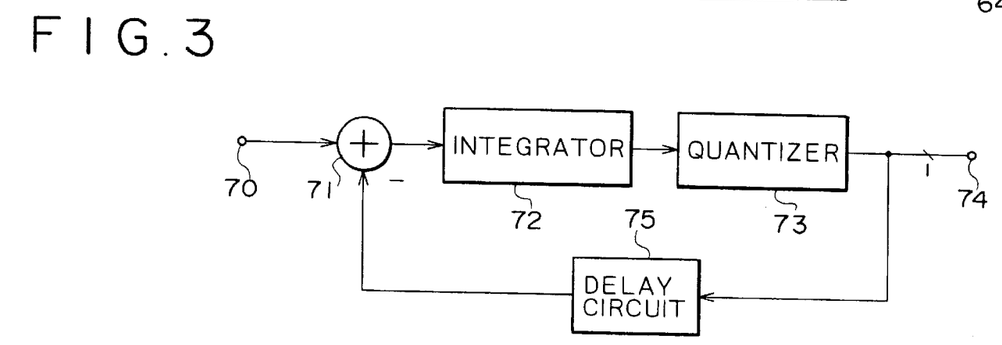
FIG. 3 is a block diagram illustrating a constitution of a ΔΣ modulator.

Referring to FIG. 3, there is shown a constitution of a ΔΣ modulator for obtaining the above-mentioned one-bit quantization data. This ΔΣ modulator comprises an adder 71, an integrator 72, a quantizer 73, and a delay circuit 75. The output of the adder 71 is supplied to the integrator 72. The output of the integrator 72 is supplied to the quantizer 73. The output of the quantizer 73 is taken out at an output terminal 74 and, at the same time, converted by the delay circuit 75 into a negative code to be fed back to the adder 71, in which the negative coded is added to the analog audio signal supplied from an input terminal 70. The output of the adder 71 is then integrated by the integrator 72. The output of the integrator 72 is quantized by the quantizer 73 in every sampling period. Consequently, one-bit quantization data can be obtained at the output terminal 74.

Meanwhile, in the case of the above-mentioned PCM signal, there is no fear that the components of higher than 22 KHz leak into devices in the succeeding stage because these components are steeply eliminated by the digital filter 53. In the case of a DSD signal, however, if the blocking by the analog low-pass filter 63 is insufficient, unnecessary high-frequency components may leak in the succeeding stage such as an amplifier or a speaker to cause cross modulation distortion, thereby deteriorating tone quality. If the above-mentioned undesired high-frequency components leak in a high amplitude into a speaker capable of reproducing with fidelity high-frequency tones of up to 100 KHz for example, the speaker may be damaged.

Figure 4:
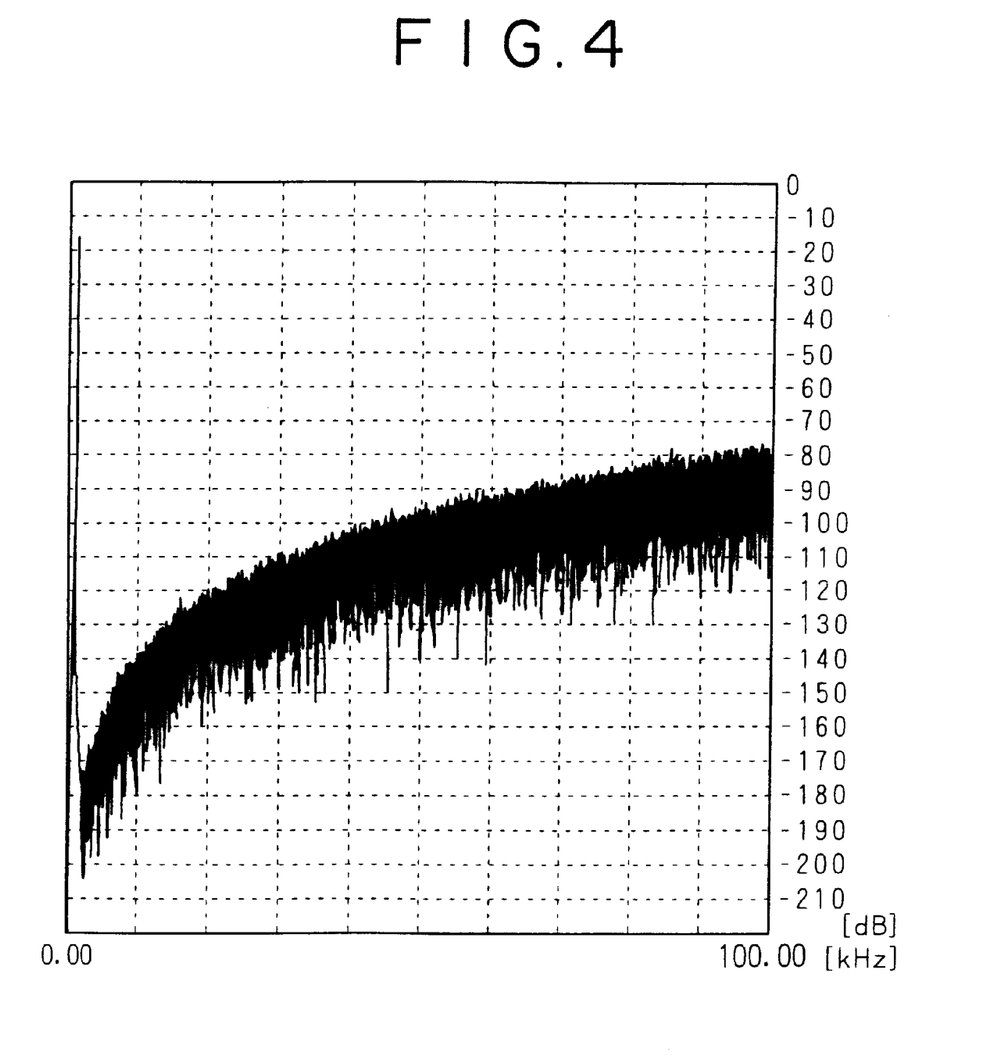
FIG. 4 is a diagram illustrating a noise characteristic obtained by a 3rd-order noise shaper.
Figure 5:
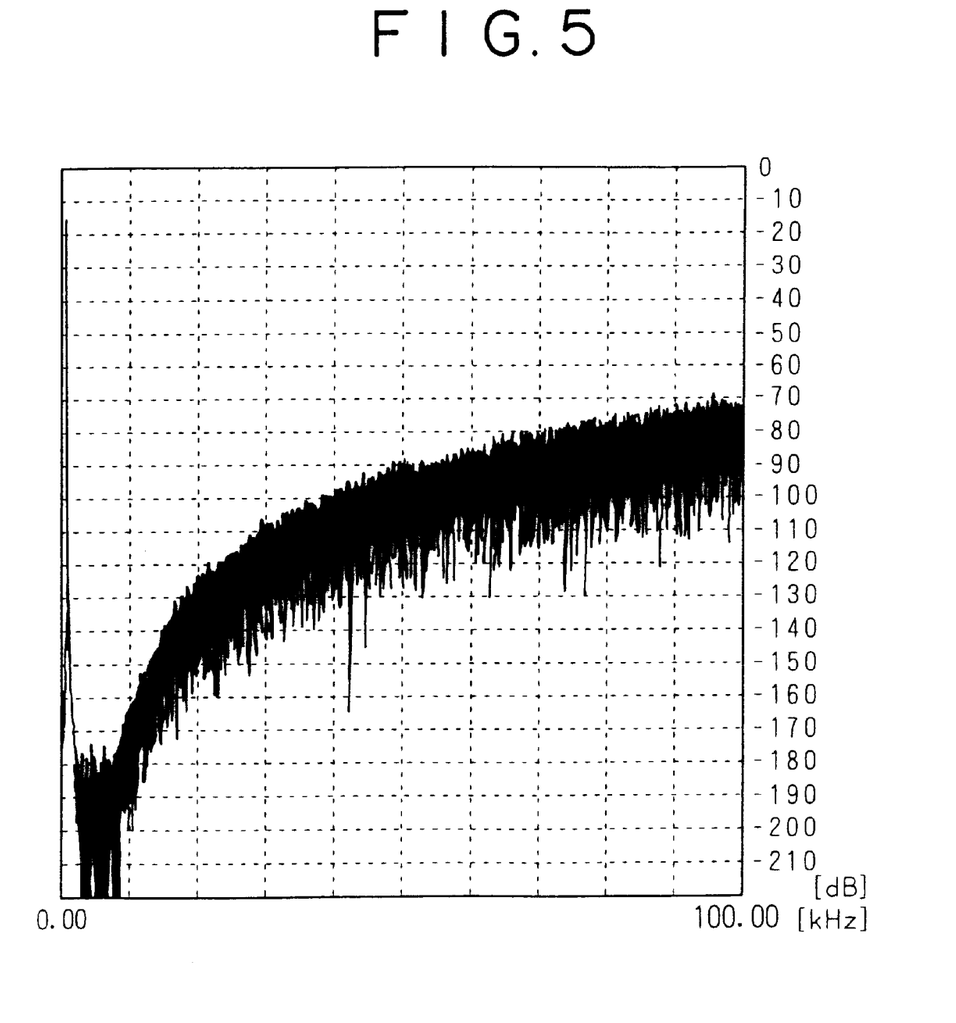
FIG. 5 is a diagram illustrating a noise characteristic obtained by a 7th-order noise shaper.

The undesired high-frequency components include a noise component that is shifted to the high-frequency side by a noise shaper when a DSD signal is recorded onto a recording medium such as an optical disc, a hard disc, or a magnetic tape. Currently, the degree of the noise shapers for generating a DSD signal is mainly 3 to 7. The low-pass filter must eliminate the high-frequency components, namely these noise components. However, in the case of a DSD signal, the characteristics of the noise shaper can be set at will in the recording system, so that it is unclear how much noise exists in which band. For example, there is an apparent difference in the quantity of undesired high-frequency component between the noise characteristic obtained by a 3rd-order noise shaper shown in FIG. 4 and the noise characteristic obtained by a 7th-order noise shaper shown in FIG. 5. The low-pass filter on the reproducing apparatus side cannot recognize this difference. Namely, when recording a DSD signal on an optical disc, a hard disc, or a magnetic disc for example, the reproducing apparatus side cannot determine whether the recording is through a 3rd-order noise shaper or a 7th-order noise shaper. Further, when a higher-order noise shaper is developed in the future, the currently available low-pass filters are not enough to block undesired high-frequency components.

Also, because DSD signal range as wide as 1.4 MHz, simply lowering the cutoff signal fc of the low-pass filter cannot fully make the most of the DSD signal performance. Consequently, it is hard to reproduce a DSD signal in the same manner as PCM signal reproduction by means of one low-pass filter.

SUMMARY OF THE INVENTION

It is therefore an object of the present invention to provide a digital signal reproducing apparatus that allows the selection of an appropriate low-pass filter according to the configuration of a succeedingly connected device and the high-frequency component of a digital signal consisting of one-bit quantization data to be reproduced and, therefore can prevent the undesired high-frequency component from leaking due to insufficient blocking into the succeeding stage, thereby preventing the cross modulation distortion from occurring in the succeeding stage.

It is another object of the present invention to provide a digital signal processing apparatus that allows selection of an appropriate low-pass filter according to the high-frequency component of a one-bit digital signal and can supply a signal with the occurrence of cross modulation distortion prevented to an amplifier.

In carrying out the invention and according to one aspect thereof, there is provided a reproducing apparatus for reproducing a recording medium recorded with a digital audio signal composed of a quantization one-bit data sampled at a sampling frequency fs (Hz) sufficiently higher than an audio band, comprising: a reproducing means for reproducing the digital audio signal from the recording medium; a signal processing means for performing predetermined signal processing on the digital audio signal reproduced by the reproducing means; a low-pass filter means having a plurality of different frequency characteristics with cutoff frequency above the audio band; and a selecting means for selecting one of the plurality of different frequency characteristics of the low-pass filter means according to a user's operation.

In carrying out the invention and according to another aspect thereof, there is provided a reproducing apparatus for reproducing a recording medium recorded with a digital audio signal composed of quantization one-bit data sampled at a sampling frequency sufficiently higher than an audio band, comprising: a reproducing means for reproducing the digital audio signal from the recording medium; a signal processing means for performing predetermined signal processing on the digital audio signal reproduced by the reproducing means; a low-pass filter means having a plurality of different frequency characteristics with cutoff frequency above the audio band; a high-frequency component testing means for measuring a high-frequency component included in the digital audio signal processed in a predetermined manner by the signal processing means; and a selecting means for automatically selecting, on the basis of a measuring result of the high-frequency component testing means, one of the plurality of different frequency characteristics of the low-pass filter means.

In carrying out the invention and according to still another aspect thereof, there is provided a signal processing apparatus for converting into an analog signal a digital audio signal composed of a quantization one-bit data sampled at a sampling frequency fs (Hz) sufficiently higher than an audio band, comprising: a receiving means for receiving the digital audio signal composed of a quantization one-bit data sampled at a sampling frequency fs (Hz) sufficiently higher than an audio band; a low-pass filter means of which cutoff frequency for filtering the digital audio signal composed of a quantization one-bit data received by the receiving means is above the audio band and having a plurality of different frequency characteristics; and a selecting means for selecting one of the plurality of different frequency characteristics of the low-pass filtering means according to a user's operation.

In carrying out the invention and according to yet another aspect thereof, there is provided a signal processing apparatus for converting into an analog signal a digital audio signal composed of a quantization one-bit data sampled at a sampling frequency fs (Hz) sufficiently higher than an audio band, comprising: a receiving means for receiving the digital audio signal composed of a quantization one-bit data sampled at a sampling frequency fs (Hz) sufficiently higher than an audio band; a low-pass filter means of which cutoff frequency for filtering the digital audio signal composed of a quantization one-bit data received by the receiving means is above the audio band and having a plurality of different frequency characteristics; a high-frequency component testing means for measuring a high-frequency component included in the digital audio signal composed of a quantization one-bit data received by the receiving means; and a selecting means for automatically selecting one of the plurality of different frequency characteristics of the low-pass filtering means on the basis of the measuring result of the high-frequency component testing means.

BRIEF DESCRIPTION OF THE DRAWINGS

These and other objects of the invention will be explained with reference to the description, taken in connection with the accompanying drawing, in which.

DETAILED DESCRIPTION OF THE PREFERRED EMBODIMENTS

Preferred embodiments of a digital signal reproducing apparatus associated with the invention will be described in detail by way of example with reference to the accompanying drawings.

First described will be a digital signal reproducing apparatus for use in a reproducing apparatus for reproducing from an optical disc a digital audio signal composed of 1-bit quantization data obtained by performing delta sigma (ΔΣ) modulation on an analog audio signal, the digital signal reproducing apparatus switching between different frequency characteristics of a low-pass filter for the above-mentioned digital audio signal according to a switching setting capability to be manually operated by a user. The above-mentioned digital audio signal will be hereafter referred to as a direct stream digital (DSD) signal.

Figure 6:
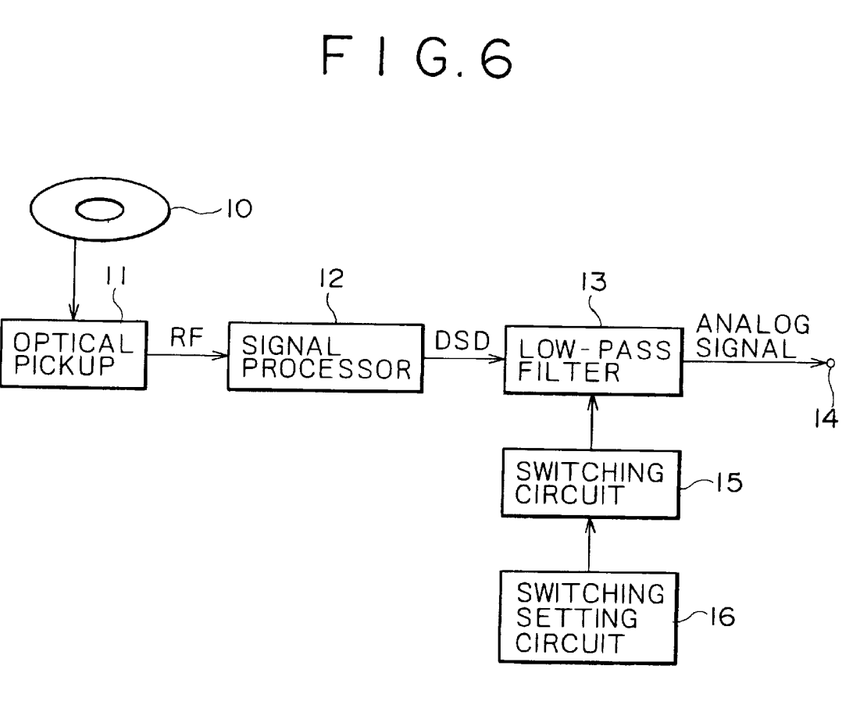
FIG. 6 is a block diagram illustrating a constitution of a first preferred embodiment of an optical disc reproducing apparatus according to the invention for reproducing a DSD signal.

An optical disc 10 which is reproduced by a digital signal reproducing apparatus shown in FIG. 6 is recorded with the above-mentioned DSD signal composed of 1-bit quantization data obtained by ΔΣ modulation processing. This digital signal reproducing apparatus comprises an optical pickup 11 for reading the DSD signal from the optical disc 10 as an RF (Radio Frequency) signal, a signal processor 12 for performing predetermined signal processing on the RF signal read by the optical pickup 11 and converting the processed signal into the DSD signal, a low-pass filter 13 with its cutoff frequency fc having two different frequency characteristics above an audio band of 20 KHz, a switching setting circuit 16 for receiving a low-pass filter switching setting operation manually performed by a user, and a switching circuit 15 for switching between the different frequency characteristics of the low-pass filter 13 according to a switching setting signal coming from the switching setting circuit 16.

Figure 7:
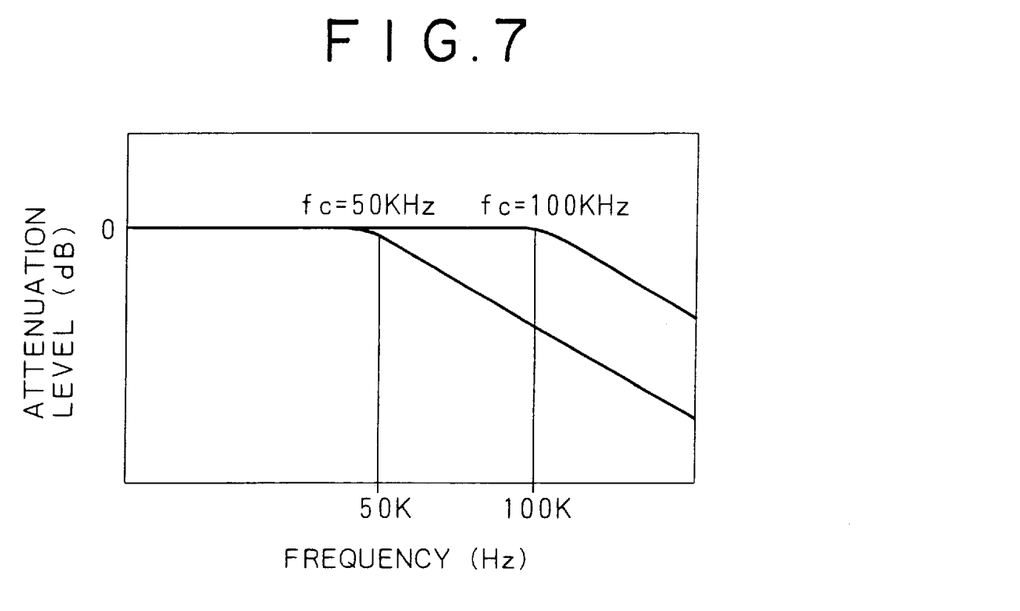
FIG. 7 is a diagram illustrating a characteristic of a low-pass filter shown in FIG. 6.

The low-pass filter 13 has the two different frequency characteristics of cutoff frequencies fc above the audio band. For example, as shown in FIG. 7, the low-pass filter 13 has the frequency characteristic with cutoff frequency fc=50 KHz and the frequency characteristic with cutoff frequency fc=100 KHz. The user can select one of these frequency characteristics.

Figure 8:
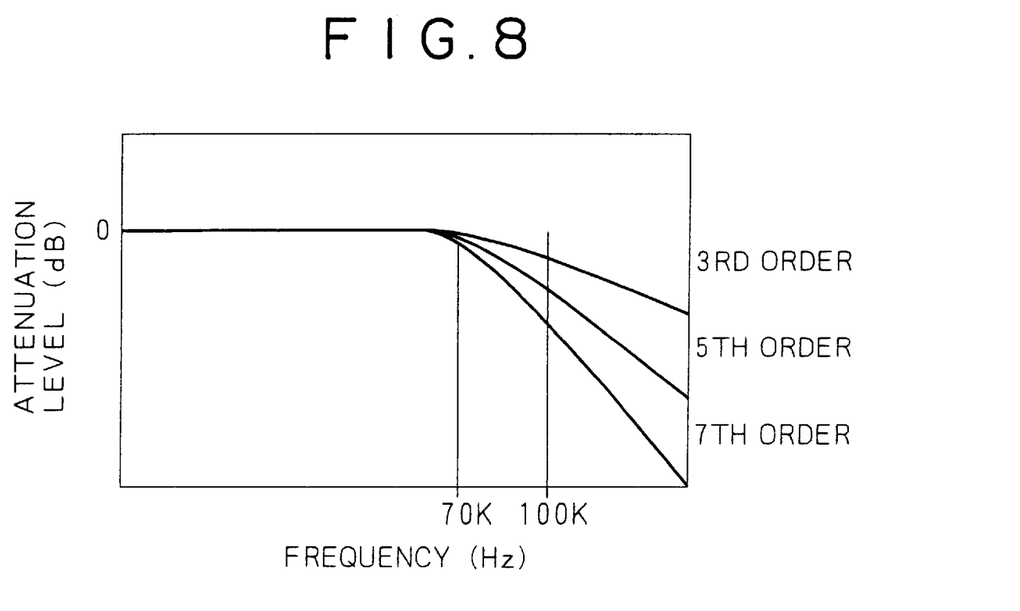
FIG. 8 is a diagram illustrating another characteristic of the low-pass filter shown in FIG. 6.

It should be noted that the low-pass filter 13 may also have two or more different frequency characteristics having different orders of attenuation characteristics above the audio band of 20 KHz. For example, these frequency characteristics are shown in FIG. 8 with third order, fifth order, and seventh order of attenuation characteristics. These frequency characteristics are obtained by varying the attenuation slope by the filter orders.

The following describes the concept of the switching setting to be executed in the switching setting circuit 16. In the reproduction of a DSD signal, it is important for the characteristics of the low-pass filter 13 to be switched between according to the capacity of a system in the succeeding stage, for example, an amplifier or a speaker. Some amplifiers or speakers are likely to cause, unlikely to cause, or do not at all cause cross modulation at a large high-frequency noise regardless of reproducible band. For the amplifiers or speakers that deteriorate tone quality by causing the cross modulation distortion of undesired high-frequency component, it is important to switch between the characteristics of the low-pass filter 13. As is clearly seen from the comparison between FIG. 4 and FIG. 5, as the order of the noise shaper goes higher, the high-frequency component gets larger in general. As the high-frequency component gets larger, the possibility of cross modulation gets higher.

Therefore, if the high-frequency component noise-shaped at recording is large and the amplifier or speaker in the succeeding stage is prone to cross modulation or if a cross modulation distortion is currently occurring, it is desired to set the cutoff frequency fc of the low-pass filter to a lower level to narrow the passing permitted band. Conversely, if the succeedingly connected system is resistant to cross modulation, the cutoff frequency fc of the low-pass filter to a higher level to widen the passing permitted band.

If the user determines that the succeedingly connected system is prone to cross modulation, namely the system can perform amplification and reproduction up to significantly high frequencies and the system will be affected by the noise-shaped high-frequency component, the user operates the switch connected to the switching setting circuit 16 such that the frequency characteristic of the low-pass filter 13 is set to the frequency characteristic with cutoff frequency fc being 50 KHz as shown in FIG. 7. Then, the switching setting circuit 16 generates a switching setting signal for switching to the frequency with cutoff frequency fc=50 KHz and supplies the generated signal to the switching circuit 15. The switching circuit 15 sends to the low-pass filter 13 a switching control signal for switching to the frequency characteristic with cutoff frequency fc=50 KHz. Consequently, the low-pass filter 13 selects the frequency characteristic with cutoff frequency fc=50 KHz, outputting at the output terminal 14 an analog audio signal obtained by filtering the DSD signal received from the signal processor 12 by the frequency characteristic shown in FIG. 7.

On the other hand, if the user determines that no distortion due to cross modulation will occur due to the noise shaping at recording, the frequency characteristic of the low-pass filter 13 is switched by the switching circuit to the frequency characteristic with cutoff frequency fc=100 KHz. Consequently, a reproduced signal of the DSD signal can be obtained in a band as wide as 1.4 MHz.

For the frequency characteristic having different orders of attenuation characteristic shown in FIG. 8, the user may select the third order, the fifth order, or the seventh order according to the compatibility with the noise shaping at recording of the succeedingly connected system.

It should be noted that, in the reproducing apparatus shown in FIG. 6, one low-pass filter 13 is used to select between two frequency characteristics having different cutoff frequencies fc and three frequency characteristics having different orders of attenuation characteristics. Instead, two low-pass filters having different cutoff frequencies fc and three low-pass filters having different orders of three attenuation characteristics may be provided to switch between these low-pass filters.

Also, for the frequency characteristic of the low-pass filter to be selected, the function of attenuation characteristic, for example, Butterworth, Bessel, or Chebishev may be used, in addition to cutoff frequency fc and attenuation characteristic slope.

Thus, according to the digital signal reproducing apparatus shown in FIG. 6, an appropriate low-pass filter characteristic is selected according to the high-frequency component of a DSD signal to be reproduced. This prevents the undesired high-frequency component from leaking into the succeeding stage due to insufficient blocking. Consequently, there occurs no cross modulation distortion in the amplifier and speaker in the succeeding stage.

The following describes a second preferred embodiment of the digital signal reproducing apparatus according to the invention.

In the second embodiment, the digital signal reproducing apparatus for reproducing from an optical disc a digital audio signal consisting of 1-bit quantization data obtained by performing delta sigma ($\Delta\Sigma$) modulation on an analog audio signal automatically switches between different frequency characteristics of a low-pass filter for the above-mentioned digital audio signal.

Figure 9:
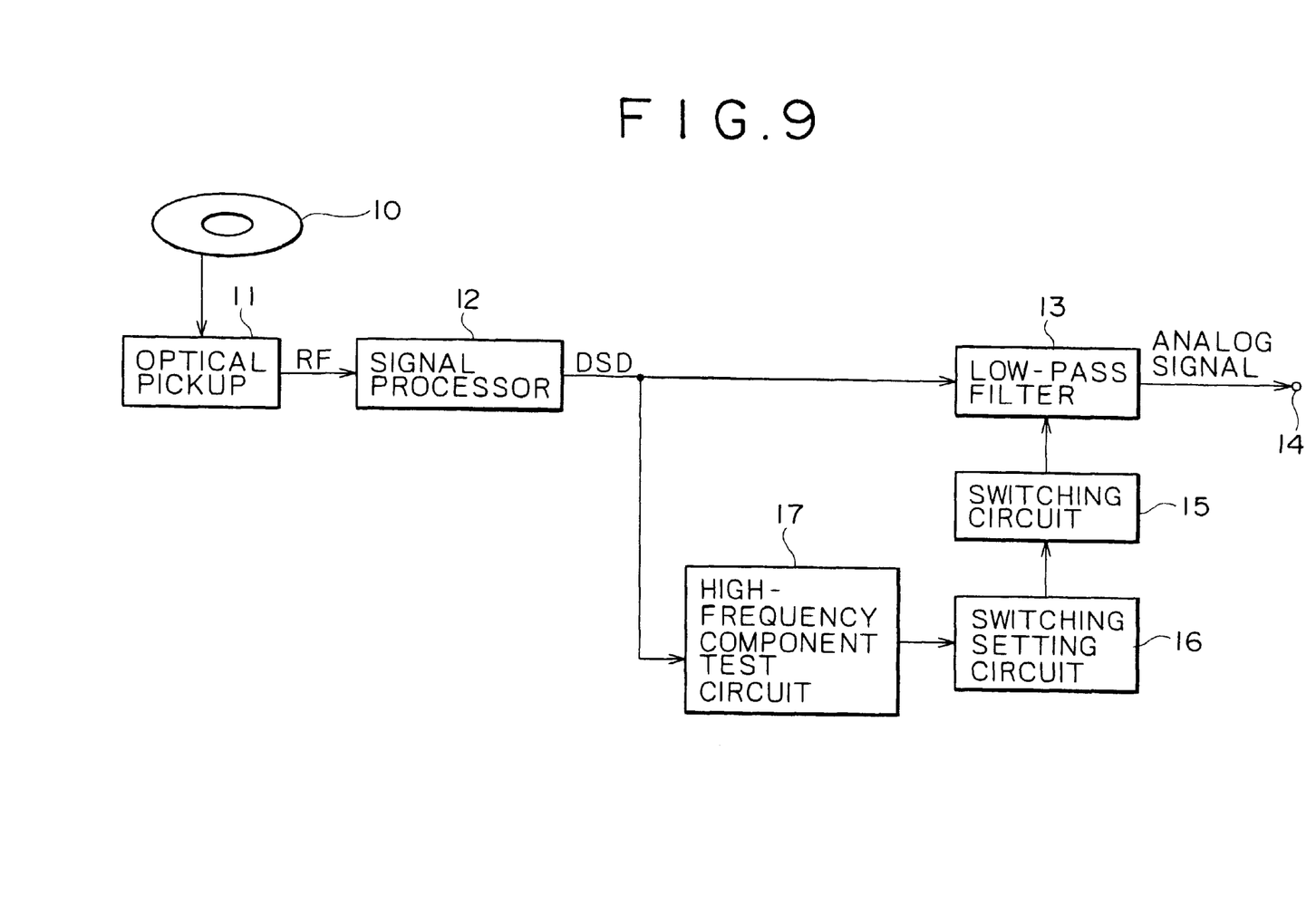
FIG. 9 is a block diagram illustrating a constitution of a second preferred embodiment of the optical disc reproducing apparatus according to the invention for reproducing a DSD signal.

An optical disc 10 of the digital signal reproducing apparatus shown in FIG. 9 is also recorded with the above-mentioned DSD signal consisting of 1-bit quantization data obtained by performing $\Delta\Sigma$ modulation. This digital signal reproducing apparatus comprises an optical pickup 11 for reading a DSD signal from the optical disc 10 as an RF signal, a signal processor 12 for performing predetermined signal processing on the RF signal read by the optical pickup 11 and converting the processed signal into the DSD signal, a low-pass filter 13 with its cutoff frequency fc having two different frequency characteristics above an audio band of 20 KHz, a high-frequency component test circuit 17 for measuring the high-frequency component included in the digital audio signal coming from the signal processor 12, a switching setting circuit 16 for automatically switching to one of the two different frequency characteristics of the low-pass filter 13 on the basis of the test result coming from the high-frequency component test circuit 17, and a switching circuit 15 for switching between the frequency characteristics of the low-pass filter 13 according to a switching setting signal coming from the switching setting circuit 16.

As shown in FIG. 7, the low-pass filter 13 has the frequency characteristic with cutoff frequency fc=50 KHz and the frequency characteristic with cutoff frequency fc=100 KHz, these frequency characteristics being automatically switched between.

The low-pass filter 13 may also has a frequency characteristic that have different orders attenuation characteristics such as the third order, the fifth order, and the seventh order as shown in FIG. 8.

The digital signal reproducing apparatus shown in FIG. 9 largely differs from the digital signal reproducing apparatus shown in FIG. 6 in the automatic switching between the characteristics of the low-pass filter 13. Hence, the high-frequency component test circuit 17 measures the high-frequency component included in the digital audio signal coming from the signal processor 12. The test result is inputted in the switching setting circuit 16 to determine the switching setting of the low-pass filter 13. On the basis of the switching setting signal coming from the switching setting circuit 16, the switching circuit 15 supplies a switching control signal to the low-pass filter 13 to switch between the frequency characteristics having different cutoff frequencies fc for example.

Figure 10:
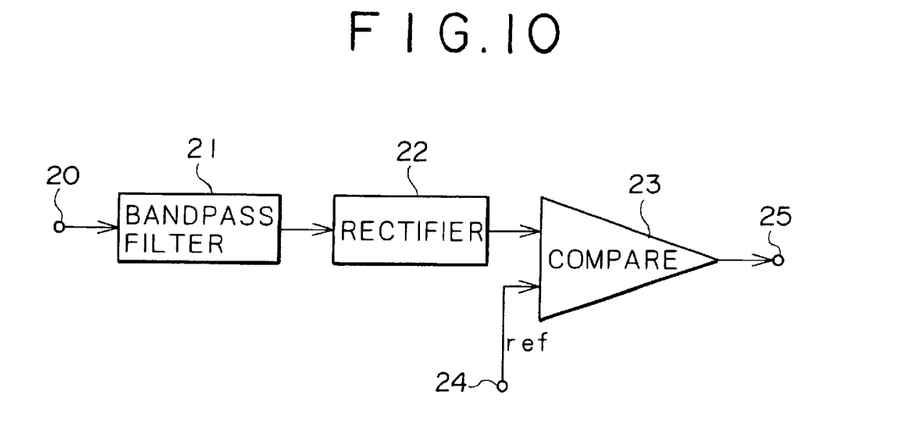
FIG. 10 is a block diagram illustrating a constitution of a first preferred embodiment of a high-frequency component test circuit shown in FIG. 9.

The high-frequency component test circuit 17, as shown in FIG. 10, comprises a bandpass filter 21 for extracting a predetermined frequency neighborhood above audio band, a rectifier 22 for rectifying a signal extracted by the bandpass filter 21, and a comparator 23 for comparing a direct current component rectified by the rectifier 22 with a fixed direct current component which is the reference level. The result of the comparison by the comparator 23 is outputted as an output signal.

The bandpass filter 21 a steep filter that passes one specific frequency above 20 KHz. A DC level is generated by rectifying through the rectifier 22 a signal passed through the bandpass filter 21 for the DSD signal supplied from the signal processor 12 via an input terminal 20. The generated DC level is compared with a reference voltage supplied via a terminal 24 generated by a Zener diode for example and the result is outputted from an output terminal 25 to the switching setting circuit 16. On the basis of the comparison result, the switching setting circuit 16 generates a switching setting signal. For example, if the DC level is found higher than the reference voltage, namely the high-frequency component is high in one specific frequency, the frequency characteristic of the low-pass filter 13 is switched to the frequency characteristic with cutoff frequency fc=50 KHz in order to prevent cross modulation distortion from occurring in the succeedingly connected system. Here, the bandpass filter 21 may extract one specific frequency band above 20 KHz.

Figure 11:
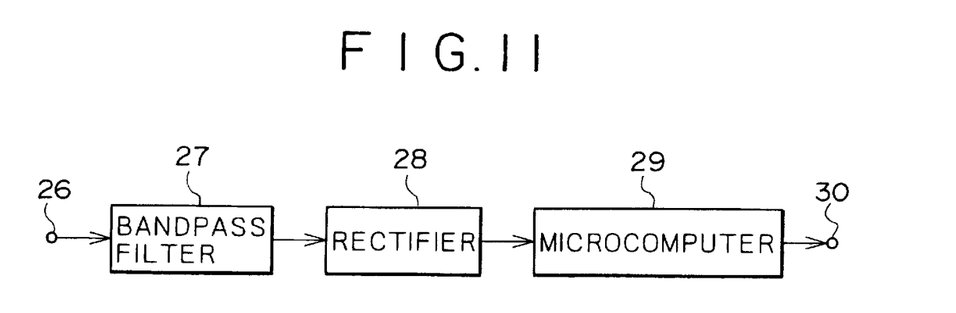
FIG. 11 is a block diagram illustrating a constitution of a second preferred embodiment of the high-frequency component test circuit shown in FIG. 9.

As shown in FIG. 11, the high-frequency component test circuit 17 may comprise a bandpass filter 27 for extracting a predetermined frequency neighbor above audio band, a rectifier 28 for rectifying the signal extracted by the bandpass filter 27, and a microcomputer 29 for making the switching setting circuit 16 generate a switching setting signal based on the direct current component obtained by the rectifier 28.

The bandpass filter 27 is a filter which is steep at a plurality of specific frequencies above 20 KHz. Of the DSD signals supplied from the signal processor 12 through an input terminal 26, the signal that passed the bandpass filter 27 is rectified by the rectifier 28 to provide a DC level to be detected. This DC level is made a digital signal by the microcomputer 29. On the basis of this digital signal, the microcomputer 29 makes the switching setting circuit 16 generate a switching setting signal. For example, if the microcomputer 29 determines that the DC level is high, namely the high-frequency component is high in several specific frequencies, the frequency characteristic of the low-pass filter 13 is switched to the frequency characteristic with cutoff frequency fc=50 KHz in order to prevent cross modulation distortion from occurring in the succeedingly connected system. Here, the bandpass filter 21 may extract one specific frequency band above 20 KHz.

Figure 12:
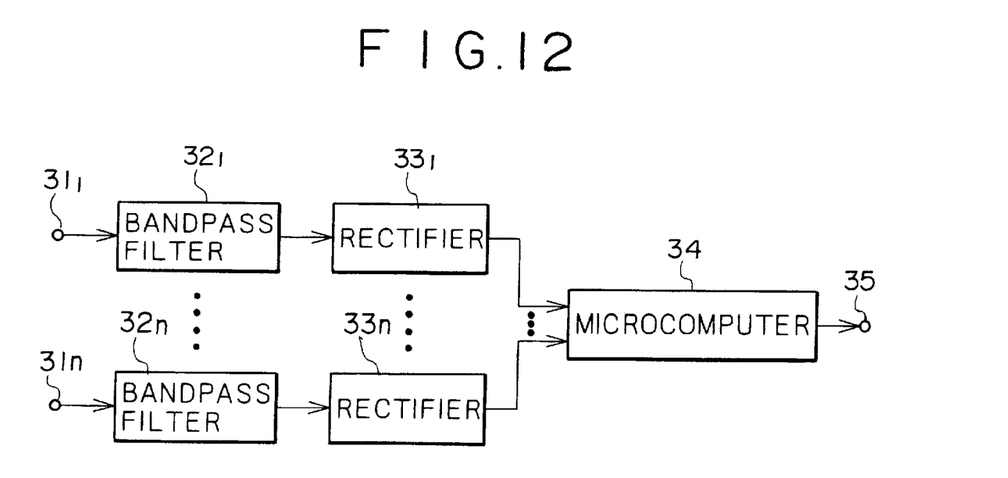
FIG. 12 is a block diagram illustrating a constitution of a third preferred embodiment of the high-frequency component test circuit shown in FIG. 9.

The high-frequency component test circuit 17 comprises, as shown in FIG. 12, a plurality of bandpass filters $32_1$ to $32_n$ for extracting a plurality of frequency neighborhoods above audio band, a plurality of bandpass rectifiers $33_1$ to $33_n$ for rectifying the signals extracted by these bandpass filters, and a microcomputer 34 for performing a predetermined computation on the basis of the DC components obtained by these rectifiers. The result of the computation by the microcomputer 34 is outputted as an output signal.

The bandpass filters $32_1$ to $32_n$ are filters that are steep in one specific frequency above 20 KHz. Of the DSD signals supplied from the signal processor 12 via input terminals $31_1$ to $31_n$, the signals that passed the bandpass filters $32_1$ to $32_n$ are rectified by the rectifiers $33_1$ to $33_n$ for DC level detection. The detected DC levels are made digital signals by the microcomputer 34. On the basis of the plurality of DC level digital signals, the microcomputer 34 makes the switching setting circuit 16 generate a switching setting signal. For example, if the microcomputer determines that the DC level is high, namely the high-frequency component is high in one specific frequency, the frequency characteristic of the low-pass filter 13 is switched to the frequency characteristic with cutoff frequency fc=50 KHz in order to prevent cross modulation distortion from occurring in the succeedingly connected system. Here, the bandpass filters $32_1$ to $32_n$ may extract one specific frequency band above 20 KHz.

Figure 13A:
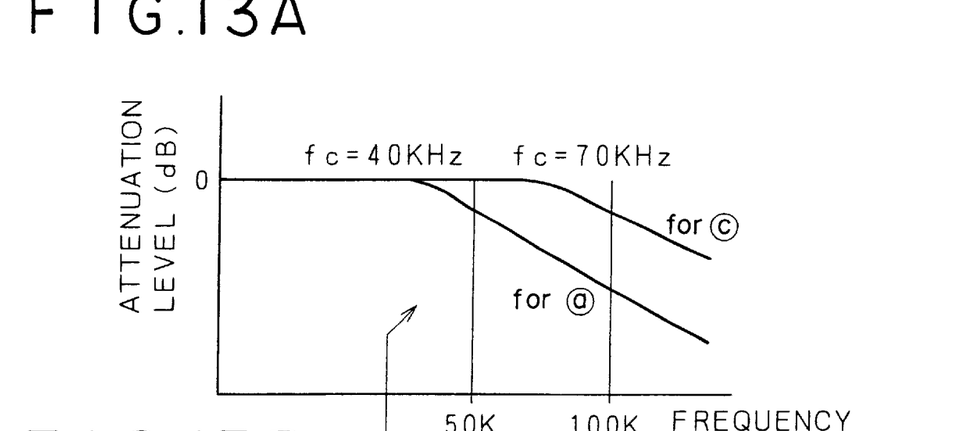
FIG. 13A is diagram illustrating a frequency characteristic of a low-pass filter with cutoff frequency varied.
Figure 13B:
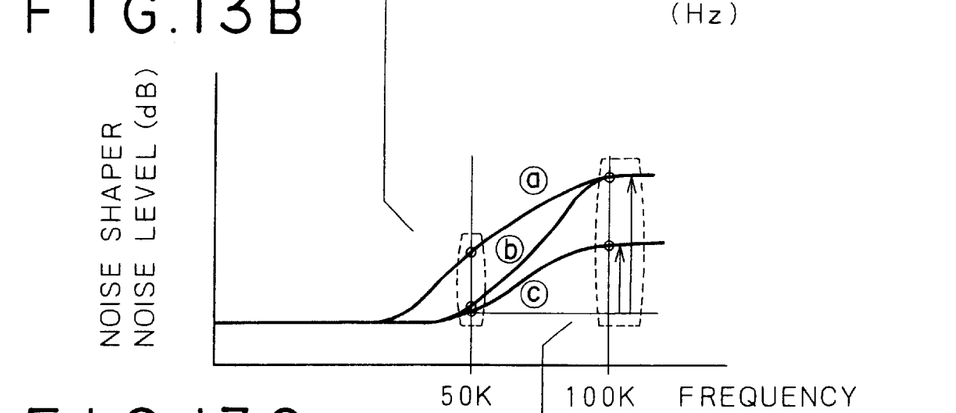
FIG. 13B is diagram illustrating a noise characteristic of a noise shaper.
Figure 13C:
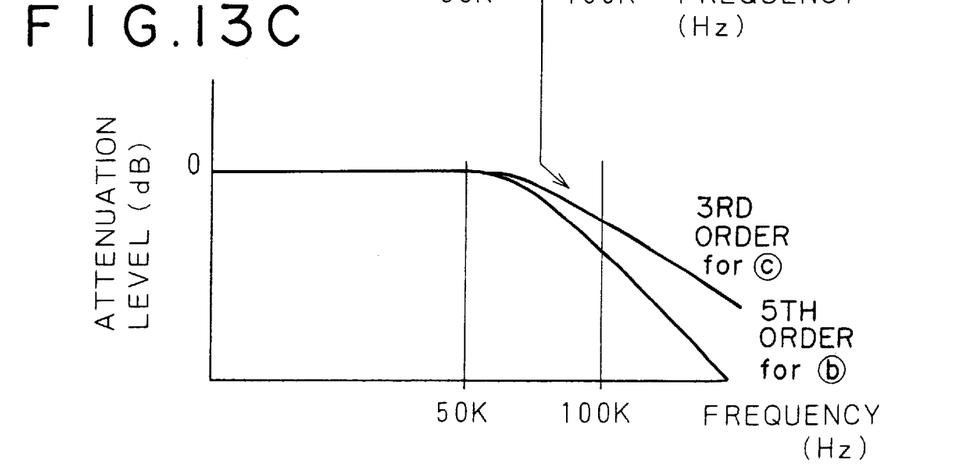
FIG. 13C is a diagram illustrating a frequency characteristic of a low-pass filter with the order changed.

FIGS. 13A through 13C illustrate specific examples of the selective switching between different frequency characteristics in low-pass filter means for the three noise characteristics obtained by noise shaper. The noise characteristics of noise shaper are "a", "b", and "c" as shown in FIG. 13B.

First, assume that the high-frequency component test circuit 17 be a circuit shown in FIG. 10 or 11 and a steep bandpass filter with passing band being 50 KHz be used. Noise characteristic "a" is high in noise level at a comparatively low frequency as 50 KHz. Conversely, noise characteristic "c" is low in noise level at a comparatively low frequency. Therefore, for noise characteristic "a", the low-pass filter 13 is set to the frequency characteristic (for "a") with cutoff frequency fc=40 KHz as shown in FIG. 13A. For noise characteristic "c", the low-pass filter 13 is set to the frequency characteristic (for "c") with cutoff frequency fc=70 KHz as shown in FIG. 13A.

Next, assume that the high-frequency component test circuit 17 be a circuit shown in FIG. 12 and a bandpass filter which is steep at two points of 50 KHz and 100 KHz be used. Noise characteristic "b" shown in FIG. 13B largely differs between two frequencies. In this case, as shown in FIG. 13C, the order of attenuation characteristic is raised to 5 and the frequency characteristic (for "b") with attenuation slope made steep is selected. For frequency characteristic "c" having a lower noise level between two frequencies, the order of attenuation characteristic is lowered to 3 and the frequency characteristic (for "c") with attenuation slope made comparatively gentle is selected.

In the signal reproducing apparatus shown in FIG. 9, only one low-pass filter 13 is used to switch between two frequency characteristics having different cutoff frequencies fc and three frequency characteristics having three different orders of attenuation characteristic. Instead, the signal reproducing apparatus alternatively may use two low-pass filters having frequency characteristics of different cutoff frequencies fc or three low-pass filters having frequency characteristics of three different orders of attenuation characteristic, these low-pass filters being switched between as required.

Also, for the frequency characteristic of the low-pass filter to be selected, the function of attenuation characteristic, for example, Butterworth, Bessel, or Chebishev may be used, in addition to cutoff frequency fc and attenuation characteristic slope.

Thus, according to the digital signal reproducing apparatus shown in FIG. 6, an appropriate low-pass filter characteristic is selected according to the high-frequency component of a DSD signal to be reproduced. This prevents the undesired high-frequency component from leaking into the succeeding stage due to insufficient blocking. Consequently, there occurs no cross modulation distortion in the succeeding stage such as an amplifier and a speaker.

Figure 14:
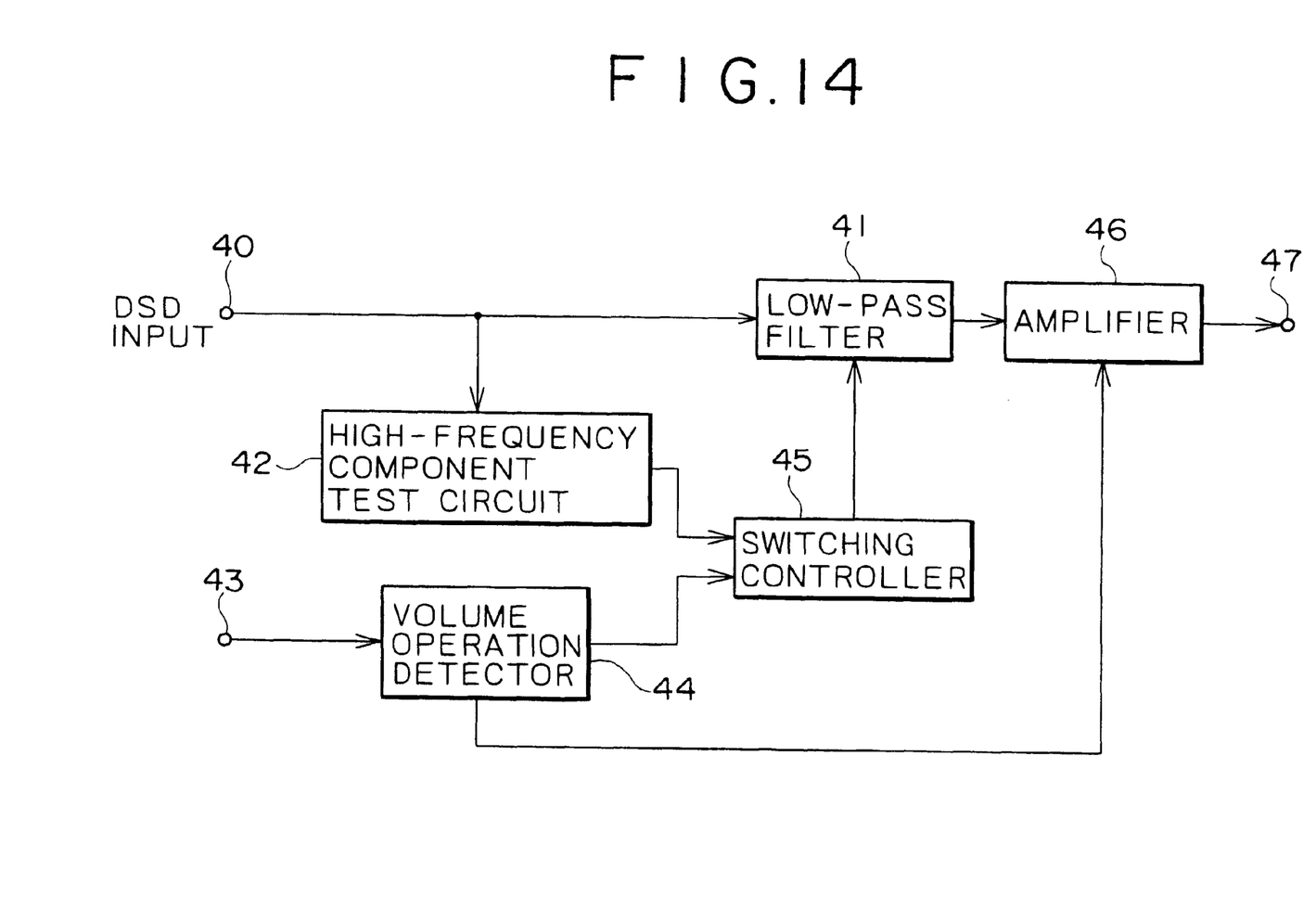
FIG. 14 is a block diagram illustrating a constitution of one embodiment of a signal processing apparatus according to the invention for reproducing a DSD signal.

The following describes a digital signal processing apparatus practiced as one preferred embodiment of the invention with reference to accompanying drawing. This preferred embodiment is a digital signal processing apparatus which is arranged in front of an amplifier 46 as shown in FIG. 14 and functions as a protecting circuit for preventing cross modulation distortion from occurring. Consequently, the amplifier 46 can amplify an analog audio signal with cross modulation distortion automatically suppressed by the digital signal processing apparatus according to the invention.

The digital signal processing apparatus according to the invention comprises a low-pass filter 41 providing different frequency characteristics with cutoff frequencies fc above audio band, a high-frequency component test circuit 42 for measuring the high-frequency component included in a DSD signal coming from an input terminal 40, a volume operation detector 44 for detecting a volume operation performed on the DSD signal, and a switching controller 45 for automatically selecting one of the different frequency characteristics of the low-pass filter 41 on the basis of an output signal of the high-frequency component test circuit 42 and a detection signal from the volume operation detector 44. This digital processing apparatus filters the DSD signal on the basis of the frequency characteristic of the low-pass filter 41 automatically selected by the switching controller 45.

The analog audio signal, the filtered output of the digital signal processing apparatus, is supplied to the amplifier 46 that amplifies the input signal on the basis of the detection signal coming from the volume operation detector 44. The analog audio signal amplified by the amplifier 46 is supplied to an output terminal 47.

As shown in FIG. 7, the low-pass filter 41 has the frequency characteristic with cutoff frequency fc=50 KHz and the frequency characteristic with cutoff frequency fc=100 KHz, which can be automatically switched between.

Also, the low-pass filter 41 may have two or more different frequency characteristics having different orders of attenuation characteristic as shown in FIG. 8 with cutoff frequency fc above audio band of 20 KHz.

In the above-mentioned digital signal processing apparatus, the characteristics of the low-pass filter 41 are also automatically switched between. Hence, the high-frequency component included in the DSD signal is measured by the high-frequency component test circuit 42. The high-frequency component test circuit 42 is generally the same in constitution as those shown in FIGS. 10 through 12. The result measured by the high-frequency component test circuit 42 is outputted to the switching controller 45. The switching controller 45 is also supplied with a detection result associated with the output level detected from the amplified output signal of the volume operation detector 44. On the basis of these pieces of information, the switching controller 45 switches between the frequency characteristics of the low-pass filter 41.

Thus, the above-mentioned digital signal processing apparatus can automatically select an appropriate characteristic of the low-pass filter according to the high-frequency component of a DSD signal, thereby preventing undesired high-frequency component from leaking. This in turn automatically prevents cross modulation distortion from occurring, protecting the amplifier 46 from damage.

In the above-mentioned digital signal processing apparatus, automatic switching between the characteristics of the low-pass filter 41 is performed according to the result of measuring by the high-frequency component test circuit 42. Instead, the user can manually switch between the characteristics of the low-pass filter 41 as shown in the embodiment of FIG. 6. In the embodiment of the digital signal processing apparatus shown in FIG. 14, the DSD signal outputted from the signal processor 62 of the optical disc reproducing apparatus shown in FIG. 2 is inputted in the DSD input terminal 40 shown in FIG. 14 through a digital interface (for example, an optical cable). Namely, the digital signal processing apparatus shown in FIG. 14 is equivalent to an amplifier having a D/A converting capability.

As described and according to the invention, the digital signal reproducing apparatus allows automatic or manual selection of an appropriate low-pass filter according to the constitution of equipment connected in the succeeding stage or the high-frequency component of a digital signal to be reproduced consisting of 1-bit quantization data. Consequently, this digital signal reproducing apparatus can automatically or manually prevent undesired high-frequency component from leaking due to insufficient blocking into the succeeding stage, thereby preventing cross modulation distortion from occurring therein.

As described and according to the invention, the digital signal processing apparatus allows selection of an appropriate low-pass filter according to the high-frequency component of an inputted 1-bit digital signal to prevent cross modulation distortion from occurring, thereby protecting the amplifier from damage.

While the preferred embodiments of the present invention have been described using specific terms, such description is for illustrative purposes only, and it is to be understood that changes and variations may be made without departing from the spirit or scope of the appended claims.

What is claimed is:

1. A reproducing apparatus for reproducing a recording medium recorded with a digital audio signal composed of quantization one-bit data sampled at a sampling frequency fs (Hz) sufficiently higher than an audio band, said reproducing apparatus comprising:

reproducing means for reproducing said digital audio signal from said recording medium;

signal processing means for performing predetermined signal processing on the digital audio signal reproduced by said reproducing means;

low-pass filter means having a plurality of different frequency characteristics each with respective cutoff frequencies above said audio band; and manually operable selecting means for selecting one of said plurality of different frequency characteristics of said low-pass filter means according to a selection manually set by a user.

2. The reproducing apparatus as claimed in claim 1, wherein each frequency characteristic of said plurality of different frequency characteristics of said low-pass filter means has a different cutoff frequency.

3. The reproducing apparatus as claimed in claim 1, wherein each frequency characteristic of said plurality of different frequency characteristics of said low-pass filter means has a different attenuation characteristic.

4. The reproducing apparatus as claimed in claim 1, wherein each frequency characteristic of said plurality of different frequency characteristics of said low-pass filter means has a different transfer function.

5. A reproducing apparatus for reproducing a recording medium recorded with a digital audio signal composed of quantization one-bit data sampled at a sampling frequency sufficiently higher than an audio band, said reproducing apparatus comprising:

reproducing means for reproducing said digital audio signal from said recording medium;

signal processing means for performing predetermined signal processing on the digital audio signal reproduced by said reproducing means;

low-pass filter means having a plurality of different frequency characteristics with cutoff frequencies above said audio band;

high-frequency component testing means for measuring a high-frequency component included in the digital audio signal processed in a predetermined manner by said signal processing means; and selecting means for automatically selecting, on the basis of a measuring result of said high-frequency component testing means, one of said plurality of different frequency characteristics of said low-pass filter means.

6. The reproducing apparatus as claimed in claim 5, wherein each frequency characteristic of said plurality of different frequency characteristics of said low-pass filter means has a different cutoff frequency.

7. The reproducing apparatus as claimed in claim 5, wherein each frequency characteristic of said plurality of different frequency characteristics of said low-pass filter means has a different attenuation characteristic.

8. The reproducing apparatus as claimed in claim 5, wherein each frequency characteristic of said plurality of different frequency characteristics of said low-pass filter means has a different transfer function.

9. The reproducing apparatus as claimed in claim 5, wherein said high-frequency component testing means comprises:

bandpass filter means for extracting a signal with a predetermined frequency neighborhood above said audio band;

rectifying means for rectifying the signal extracted by said bandpass filter means;

comparing means for comparing a direct current component obtained by said rectifying means with a reference direct current component; and output means for outputting a result of the comparison made by said comparing means as said measuring result.

10. The reproducing apparatus as claimed in claim 5, wherein said high-frequency component testing means comprises:

a plurality of bandpass filter means for extracting a plurality of signals with a plurality of frequency neighborhoods above said audio band;

a plurality of rectifying means for rectifying the plurality of signals extracted by said plurality of bandpass filter means; and computing means for performing predetermined computation on the basis of a direct current component obtained by said plurality of rectifying means.

11. A signal processing apparatus for converting into an analog signal, a digital audio signal composed of quantization one-bit data sampled at a sampling frequency fs (Hz) sufficiently higher than an audio band, said signal processing apparatus comprising:

receiving means for receiving said digital audio signal;

low-pass filter means with a selectable cutoff frequency for filtering said digital audio signal received by said receiving means that is above said audio band and having a plurality of different frequency characteristics each having a respective different cutoff frequency; and manually operable selecting means for selecting one of said plurality of different frequency characteristics of said low-pass filter means according to a selection manually set by a user.

12. The signal processing apparatus as claimed in claim 11, wherein each frequency characteristic of said plurality of different frequency characteristics of said low-pass filter means has a different cutoff frequency.

13. The signal processing apparatus as claimed in claim 11, wherein each frequency characteristic of said plurality of different frequency characteristics of said low-pass filter means has a different attenuation characteristic.

14. The signal processing apparatus as claimed in claim 11, wherein each frequency characteristic of said plurality of different frequency characteristics of said low-pass filter means has a different transfer function.

15. A signal processing apparatus for converting into an analog signal, a digital audio signal composed of quantization one-bit data sampled at a sampling frequency fs (Hz) sufficiently higher than an audio band, said signal processing apparatus comprising:

receiving means for receiving said digital audio signal;

low-pass filter means with a cutoff frequency for filtering said digital audio signal received by said receiving means that is above said audio band and having a plurality of different frequency characteristics;

high-frequency component testing means for measuring a high-frequency component included in the digital audio signal received by said receiving means; and selecting means for automatically selecting one of said plurality of different frequency characteristics of said low-pass filtering means on the basis of a measuring result of said high-frequency component testing means.

16. The signal processing apparatus as claimed in claim 15, wherein each frequency characteristic of said plurality of different frequency characteristics of said low-pass filter means has a different cutoff frequency.

17. The signal processing apparatus as claimed in claim 15, wherein each frequency characteristic of said plurality of different frequency characteristics of said low-pass filter means has a different attenuation characteristic.

18. The signal processing apparatus as claimed in claim 15, wherein each frequency characteristic of said plurality of different frequency characteristics of said low-pass filter means has a different transfer function.

19. The signal processing apparatus as claimed in claim 15, wherein said high-frequency component testing means comprises:
  bandpass filter means for extracting a signal with a predetermined frequency neighborhood above said audio band;
  rectifying means for rectifying the signal extracted by said bandpass filter means;
  comparing means for comparing a direct current component obtained by said rectifying means with a reference direct current component; and
  output means for outputting a result of the comparison made by said comparing means as said measuring result.

20. The reproducing apparatus as claimed in claim 15, wherein said high-frequency component testing means comprises:
  a plurality of bandpass filter means for extracting a plurality of signals with a plurality of frequency neighborhoods above said audio band;
  a plurality of rectifying means for rectifying the plurality of signals extracted by said plurality of bandpass filter means; and
  computing means for performing predetermined computation on the basis of a direct current component obtained by said plurality of rectifying means.

* * * * *